US008692522B2

(12) United States Patent
Herz et al.

(10) Patent No.: US 8,692,522 B2
(45) Date of Patent: Apr. 8, 2014

(54) DEVICE FOR DETECTING A CHANGE IN A GENERATOR OUTPUT SIGNAL OF A VEHICLE GENERATOR

(75) Inventors: Michael Herz, Stuttgart (DE); Egon Reisz, Reutlingen (DE); Thomas Koss, Reutlingen (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 12/998,506

(22) PCT Filed: Oct. 19, 2009

(86) PCT No.: PCT/EP2009/063661
§ 371 (c)(1),
(2), (4) Date: Jun. 22, 2011

(87) PCT Pub. No.: WO2010/049305
PCT Pub. Date: May 6, 2010

(65) Prior Publication Data
US 2011/0241631 A1    Oct. 6, 2011

(30) Foreign Application Priority Data
Oct. 27, 2008   (DE) .......................... 10 2008 043 201

(51) Int. Cl.
*H02P 9/00*     (2006.01)
*H02J 7/16*     (2006.01)

(52) U.S. Cl.
USPC .............................................. 322/28; 322/23

(58) Field of Classification Search
USPC ............................. 322/23, 27, 28, 37; 361/23
See application file for complete search history.

(56) References Cited

U.S. PATENT DOCUMENTS

| 4,665,490 | A  |   | 5/1987 | Masaki et al. |
|-----------|----|---|--------|---------------|
| 5,245,495 | A  | * | 9/1993 | Bailey et al. ..................... 361/23 |
| 7,170,263 | B2 | * | 1/2007 | Yamamoto et al. ............. 322/59 |
| 7,191,765 | B2 | * | 3/2007 | Santero ......................... 123/490 |
| 7,336,000 | B2 | * | 2/2008 | Stahlhut et al. ................. 290/52 |
| 7,368,893 | B2 | * | 5/2008 | Tsuzuki .......................... 322/28 |
| 8,400,117 | B2 | * | 3/2013 | Fourmy et al. .................. 322/23 |

FOREIGN PATENT DOCUMENTS

| DE | 197 32 961  | 2/1999 |
|----|-------------|--------|
| EP | 0 412 618   | 2/1991 |
| EP | 0 422 732   | 4/1991 |
| EP | 1 180 841   | 2/2002 |
| GB | 1 383 621   | 2/1974 |
| JP | 3-78658     | 4/1991 |
| JP | 3-134573    | 6/1991 |
| JP | 5-23135     | 3/1993 |
| JP | 11-44554    | 2/1999 |
| JP | 11-125536   | 5/1999 |
| JP | 2001-501437 | 1/2001 |
| JP | 2002-17053  | 1/2002 |
| JP | 2002-125398 | 4/2002 |
| JP | 2003-174797 | 6/2003 |
| JP | 2004-177228 | 6/2004 |

* cited by examiner

*Primary Examiner* — Nicholas Ponomarenko
(74) *Attorney, Agent, or Firm* — Kenyon & Kenyon LLP

(57) ABSTRACT

A device for detecting a change in a generator output signal of a vehicle generator includes a window comparator for comparing a signal amplitude of the generator output signal to at least one threshold value which limits a signal amplitude range, a detector for detecting a change in the generator output signal based on an output signal of the window comparator, a detection unit for detecting a signal amplitude difference between a maximum signal amplitude and a minimum signal amplitude of the generator output signal, and an adaptation unit for adapting the signal amplitude range of the window comparator, based on the signal amplitude difference, when there is the change in the generator output signal.

11 Claims, 9 Drawing Sheets

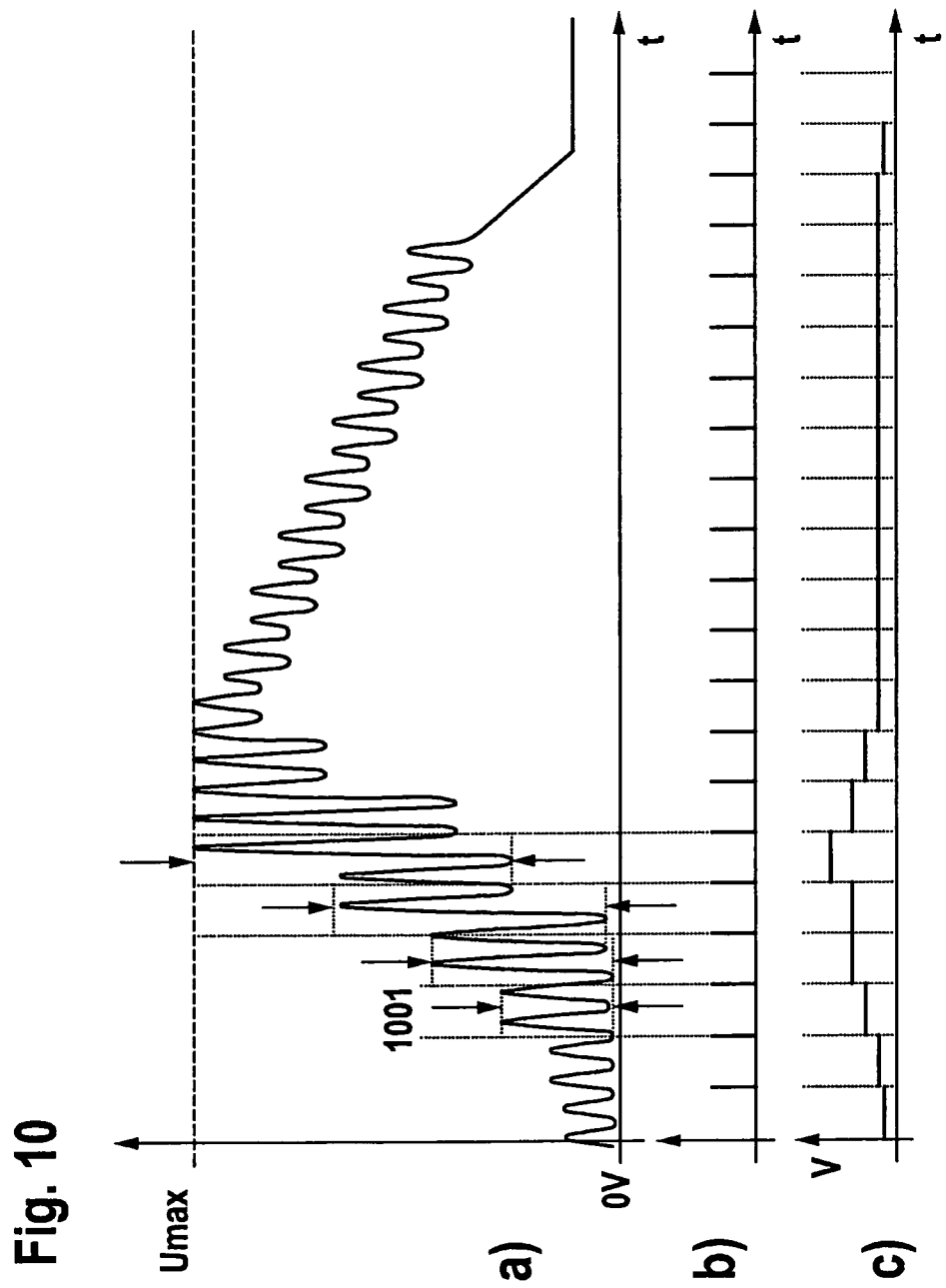

DEVICE FOR DETECTING A CHANGE IN A GENERATOR OUTPUT SIGNAL OF A VEHICLE GENERATOR

BACKGROUND OF THE INVENTION

1. Field of the Invention

The present invention relates to vehicle generators which are used for supplying electrical power to a vehicle for example.

2. Description of Related Art

Generators which are driven by a drive source, for example, an internal combustion engine, are often used to supply power in vehicles. Such generators are often three-phase or multiphase, a phase signal, for example, a U, V or W signal in the form of a generator output signal, being assigned to each phase and output. Most generator output signals form a total multiphase generator signal, which may be fed into a vehicle electrical system after rectification, for example.

Based on a coupling between the drive source, for example, an internal combustion engine, and the generator, each of the generator output signals may be used for detection of the running drive source and thus also an instantaneous generator speed. For example, a generator regulator, which uses one or more generator output signals to analyze a phase frequency, i.e., a frequency of a generator output signal and/or a phase amplitude, i.e., an amplitude of a generator output signal, may be used for this purpose.

For frequency analysis, for example, a change in a generator output signal may be detected, a number of changes in the generator output signal within a predetermined period of time allowing an inference regarding its frequency, so-called phase frequency. The frequency analysis is usually performed by an analysis circuit, for example, a frequency or phase analysis circuit. For detecting a change in a generator output signal, for example, one fixed threshold or two fixed thresholds and a hysteresis may be used, whose difference defines a signal amplitude range. In the case of generator output signals of variable amplitude, variable thresholds may also be provided, as described in published German patent application document DE 19732961 A1, for example. In addition, the frequency analysis may be performed on the basis of a differentiation between generator output signals assigned to two different phases.

Known methods for detecting a frequency of a generator output signal are based on its sinusoidal or square-wave curve. FIGS. 1 and 2 show examples of curves 101 and 201 of such generator output signals. However, based on the development of modern generators having three or more phases, based on mechanical changes or the use of compensation magnets or permanent magnets, a generator output signal to be analyzed may change greatly in the flank area in particular, which may result in an analysis of a phase amplitude or a phase frequency no longer being performable in all frequency and load ranges. FIGS. 3, 4 and 5 show a few curves 301, 401 and 501 of such generator output signals as examples. The flank transitions, which are no longer vibration-free and which sometimes may have high-frequency components, are problematical for the analysis methods known so far.

In addition, one must also take into account the fact that a speed range of a generator may be in a speed band between 0 and 20,000 rpm. This yields a phase frequency of 0 to 2000 Hz for a six-claw pole pair generator or 0 to 2700 Hz for an eight-claw pole pair generator, so that the frequency analysis must often be performed in a wide frequency band. Furthermore, interference signals whose interference frequency may be at low speeds and therefore low-phase frequencies in the case of a useful signal frequency of a generator output signal may be superimposed on the generator output signals at high generator speeds or generator phase frequencies.

FIG. 6 shows as an example a curve 601 of a generator output signal having a voltage amplitude $U_{Phase}$ at low speeds, an interference signal of duration $t_{stör}$ being superimposed on this generator output signal within a time interval 603. A curve 605 of a generator output signal at higher frequencies is shown for comparison; its period 607, which corresponds to a useful duration $t_{Nutz}$, may correspond to interference period 603.

The interference signals also distort the amplitudes of the generator output signals. If the amplitudes of the generator output signals are low at a peak-to-peak voltage of less than 1 $V_{SS}$, then interference levels whose interference amplitude is greater than 1 $V_{SS}$ have a negative effect on the analysis accuracy of threshold-based frequency analysis concepts.

To analyze the frequency of a generator output signal, for example, a configuration shown in FIG. 7a may be used. A generator output signal, for example, a U, V or W phase component of a generator total output signal, is conveyed to a first comparator 703 and to a second comparator 705 via an input terminal 701. The outputs of comparators 703 and 705 are connected to a detection element 707, which detects whether thresholds predetermined by comparator 703 and 705 have been undershot or exceeded. A first output 709 of detection element 707 indicates that an upper threshold has been exceeded; a second output 711 indicates that the generator output signal has dropped below a lower threshold. A third output 713 indicates that the generator output signal is within the window range predetermined by comparators 703 and 705. An incrementer and decrementer 715 is connected downstream from detection element 707, whose output is connected to a d.c. voltage offset element 717. One output of d.c. voltage offset element 717 is connected to a second input of comparator 705 and to an element 718, whose additional output is connected to another input of comparator 703. The upper and lower thresholds for comparators 703 and 705 may be set via element 718 in advance. Furthermore, an element 719, which transmits a regulator status of a generator regulator to element 718, is also provided. One output of detection element 707 is also connected to a frequency detection element 721, over whose output the phase frequency may be output. Therefore, a change in the generator output signal from which the phase frequency may be derived, for example, may be implemented on the basis of a window comparator having a detector and counter downstream from the latter.

FIG. 7b shows a block diagram of a device for detecting a change in an output signal, which is completely digital. For this purpose, this device, in contrast with the device from FIG. 7a, includes an upstream analog-to-digital converter 719. Furthermore, an element 720, which transmits a regulator status of a generator regulator to element 718, is also provided.

BRIEF SUMMARY OF THE INVENTION

The present invention is based on the finding that an efficient concept for detecting a change in a generator output signal, for example, a phase signal of a total multiphase generator signal, may be accomplished for a plurality of generator implementation variants by an adaptive design of the signal window range defined by an upper threshold and a lower threshold of a window comparator. A single generator output signal, for example, the U, V or W signal of a total multiphase generator signal, may be processed.

According to one aspect of the present invention, a device is provided for detecting a change in a generator output signal of a vehicle generator having a window comparator for comparing a signal amplitude of the generator output signal with at least one threshold value, which limits a signal amplitude range, and a detector for detecting a change in the generator output signal based on an output signal of the window comparator. The device also includes a detection unit for detecting a signal amplitude difference between a maximum signal amplitude and a minimum signal amplitude of the generator output signal, so that an amplitude swing of the generator output signal is detected in the form of a peak-to-peak voltage and/or a peak-to-peak current. The device also includes an adaptation unit for adapting the signal amplitude range of the window comparator on the basis of the signal amplitude difference when there is a change in the generator output signal. By adapting the signal amplitude range by which a signal amplitude window of the window comparator is established, the efficiency range of the window comparator may be adaptively matched with each type of generator output signal.

According to one specific embodiment, the window comparator includes a first comparator for comparing the signal amplitude with an upper threshold value of the signal amplitude range and a second comparator for comparing the signal amplitude with a lower threshold value of the signal amplitude range. The signal amplitudes may be, for example, current or voltage amplitudes, the implementation of the window comparator using the two separate comparators being an efficient and advantageous implementation option.

According to another exemplary embodiment, the detection unit is designed to detect the signal amplitude difference within a predetermined or preselectable time interval. A detection time interval may thereby be adapted advantageously to an expected period of the generator output signal.

According to one specific embodiment, the detection unit includes a processor unit for determining a control parameter as a function of the signal amplitude difference according to a computation rule. The processor unit may advantageously be provided to determine the control parameter by reducing the signal amplitude difference by one half or by one third or on the basis of a lookup table in which various control parameters are assigned to various signal amplitude differences and to send the control parameter to the adaptation unit, which then increases or decreases the signal amplitude range in response thereto. Therefore, a simple rule is provided on the basis of which the signal range of the window comparator may be adapted advantageously as a function of a range of the generator output signal. The processor unit may be implemented in software or hardware using a processor having a microcontroller, for example, or as a discrete digital circuit.

According to one specific embodiment, the detection unit is designed to determine the signal amplitude difference on the basis of the generator output signal itself or on the basis of an output signal of the detector, so that advantageous circuit flexibility is achieved.

According to one specific embodiment, the detector includes a detection element for detecting a change in the signal amplitude difference and a counter downstream from the detection element to increment or decrement a numerical value as a function of the change in the signal amplitude difference. The concept according to the present invention may thus also be used to advantage in existing systems.

According to one specific embodiment, the detector is connected downstream from the window comparator, so that a direct signal analysis is possible.

According to one specific embodiment, a d.c. voltage offset element is provided for transmitting a d.c. voltage offset to the adaptation unit, which applies the signal amplitude range as a function of the d.c. voltage offset, so that the range is easily shiftable along a signal amplitude axis.

According to one specific embodiment, a frequency detection element is provided for detecting a frequency of the generator output signal on the basis of a change in the signal amplitude frequency. The frequency detection element is preferably downstream from the detection unit of the detector and is provided for determining the frequency of the generator output signal on the basis of a detected change with respect to one or more threshold values within a predetermined time interval, for example. A speed of a drive source driving the generator as well as a drive start are detectable in a particularly advantageous manner in this way.

According to one specific embodiment, the device includes an upstream filter unit for filtering the generator output signal to obtain a filtered generator output signal. The filter unit preferably has a predetermined filter characteristic having a cutoff frequency which may be variable. The device also includes a detection unit for detecting a frequency of the filtered generator output signal to thereby obtain the frequency of the generator output signal. Furthermore, an adaptation unit is provided for adapting the cutoff frequency of the filter unit as a function of the detected frequency. The passband of the filter unit is therefore enlarged or decreased, for example, so that a useful frequency adaptation may always be performed.

According to one specific embodiment, the filter characteristic of the filter unit is a low-pass characteristic or a band-pass characteristic or a high-pass characteristic, so that the cutoff frequency may be an upper or a lower cutoff frequency. The filter unit may advantageously be designed as a digital or analog unit in the form of an input filter having an adjustable cutoff frequency.

According to one specific embodiment, the filter unit has a filter characteristic of the first or second filter order or at most the third filter order. This advantageously ensures that even useful frequency components may be detected outside of the cutoff frequency filters on the basis of the lower damping associated with these filter orders.

According to one specific embodiment, the filter unit has a filter characteristic, which correlates with damping in a predetermined frequency range outside of the cutoff frequency, preferably not exceeding a predetermined damping value. The increase in damping may amount to 6 dB per octave, 12 dB per octave or 18 dB per octave, for example. Therefore, in an analysis of an energy or power of the generator output signal in a frequency band outside of the cutoff frequency, the known damping characteristic may be taken into account in an advantageous manner.

According to one specific embodiment, the adaptation unit is preferably designed to increase the cutoff frequency if the detected cutoff frequency is outside of the cutoff frequency and a signal value exceeds a predetermined threshold value at the detected frequency. The signal value may be a signal amplitude or a signal power or a signal energy of the generator output signal, for example. The predetermined threshold value may be expressed in percent, for example, and may be 1%, 2% or 10% of a signal value at the cutoff frequency. This permits a more accurate detection of the useful frequency range.

According to one specific embodiment, the adaptation unit is designed to reduce the cutoff frequency if the detected cutoff frequency is lower than the cutoff frequency and a generator signal value falls below a predetermined threshold value at the detected frequency. This threshold value may also be expressed in percent and amounts to, for example, less than 1% of a signal value at the cutoff frequency. Therefore in an advantageous manner an optimal adaptation of the passband at the useful frequency band is achieved with a reduction in interference at the same time.

According to another aspect of the present invention, a method is provided for detecting a change in a generator output signal of a vehicle generator by comparing a signal amplitude of the generator output signal with at least one threshold value, which limits a signal amplitude range, detecting a change in the generator output signal on the basis of an output signal of the window comparator, detecting a signal amplitude difference between a maximum signal amplitude and a minimum signal amplitude of the generator output signal and adapting the signal amplitude range of the window comparator on the basis of the signal amplitude difference when there is a change in the generator output signal. Additional method steps are derived directly from the functionality of the device according to the present invention for detecting a change in a generator output signal.

BRIEF DESCRIPTION OF THE DRAWINGS

FIGS. 10a-10c show signal curves as a function of time.

DETAILED DESCRIPTION OF THE INVENTION

Figure 8:
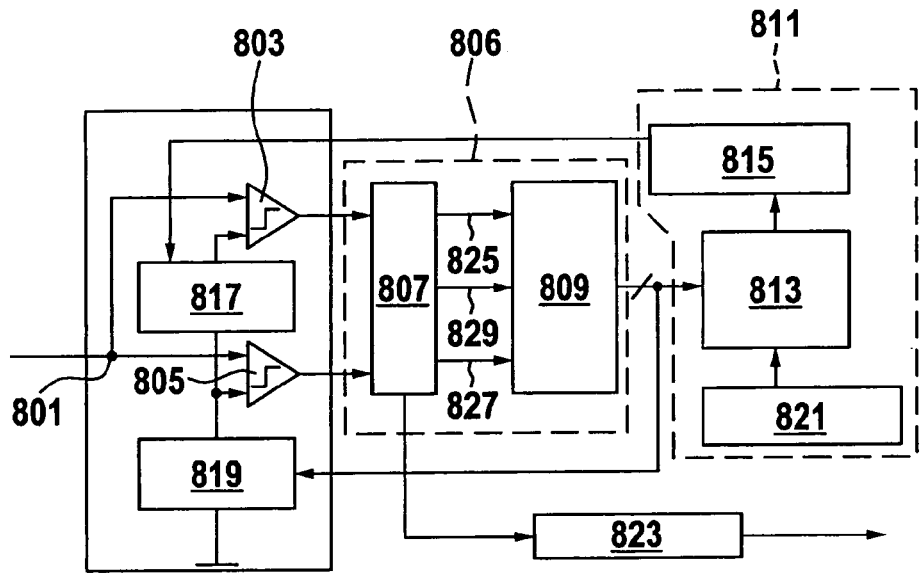
FIG. 8 shows a block diagram of a device for detecting a change in a generator output signal.

FIG. 8 shows a block diagram of a device for detecting a change in a generator output signal, for example, a change in phase or frequency. The device includes an input terminal 801, to which a generator output signal, for example, a U or V or W signal, may be applied. A window comparator is connected downstream from input terminal 801 which has a first comparator 803 and a second comparator 805, for example. A detector 806 is connected downstream from the window comparator and has, for example, a detection element 807 and a counter 809, which is connected downstream from detection element 807 and whose output forms an output of detector 806. Furthermore, a detection unit 811 is connected downstream from detector 806.

Detection unit 811 preferably includes a determination unit 813 for determining a signal amplitude difference and a processor unit 815, which is connected downstream from determination unit 813, which determines a control parameter as a function of the signal amplitude difference conveyed to it. One output of processor unit 815 is connected to an input of adaptation unit 817. Adaptation unit 817 is connected to the window comparator and for this purpose includes, for example, outputs, each of which is connected to first comparator 803 and second comparator 805.

The output of detector 806 is also connected to a d.c. voltage offset element 819, which is situated between ground and adaptation unit 817, for example. One output of d.c. voltage offset element 819 is also connected to the window comparator, for example, to an input of second comparator 805.

The device optionally includes a timer 821, which is coupled to determination unit 813 and is provided for specifying a time window in which the signal amplitude difference is to be determined. The device also includes a frequency analysis unit 823, which is connected downstream from detection element 807.

The device shown in FIG. 8 may have both digital and analog elements. For example, the window comparator and adaptation unit 817 and d.c. voltage offset element 819 may be designed as analog elements, for example. The other circuit elements are preferably digital.

During operation, a generator output signal having a signal amplitude, for example, a signal amplitude $U_P$, is conveyed to the device shown in FIG. 8 via a phase terminal of a generator, for example, and is supplied to first comparator 803 and to second comparator 805 of the window comparator via input terminal 801. First comparator 803 is provided, for example, to compare the generator output signal to an upper threshold value, while second comparator 805 compares the generator output signal to a lower threshold value. A difference between the upper threshold value and the lower threshold value yields a threshold value range, which corresponds to a comparator window. First comparator 803 generates an output signal, for example, if the signal amplitude of the generator output signal exceeds the upper threshold value. Similarly, second comparator 805 generates an output signal if the signal amplitude of the generator output signal falls below the lower threshold value. Detection element 807 downstream from the window comparator detects a change in the corresponding output of corresponding comparator 803 and 805 and generates on this basis an output signal, which prompts downstream counter 809 to increment, to decrement or to remain in the present state. For this purpose, detection element 807 may have a single output, which is supplied to the counter. Alternatively, detection element 807 may have three outputs, so that exceeding the upper threshold is indicated via a first output 825, dropping below the lower threshold is indicated via a second output 827, and the generator output signal remaining within the signal amplitude range predetermined by the window comparator is optionally indicated via a third output 829. In addition, it is also possible to recognize, on the basis of dropping below or exceeding the upper or lower threshold, whether the generator output signal is within the window comparator range or above or below that.

A phase cycle and thus a phase frequency could be inferred from the change in one of the output signals of corresponding comparator 803 and 805. For this purpose, a signal indicating a change in the corresponding comparator output is conveyed to frequency detection unit 823 via detection element 807. Frequency detection unit 823 ascertains a present frequency of the generator output signal on the basis of a number of changes in the comparator output signals within a predetermined time interval, for example.

Counter 809, which is connected downstream from detection element 807, increments or decrements a numerical value as a function of whether the signal amplitude exceeds the upper threshold value and/or drops below the lower threshold value. Determination unit 813 connected downstream from counter 809 detects a signal amplitude difference, i.e., a difference between a maximum signal amplitude and a minimum signal amplitude within a predetermined time interval, which may be predefined by time window element 821, for example. Information about the signal amplitude difference, for example, a difference between the peak voltage values, is conveyed to the processor unit, which ascertains a control parameter for adaptation unit 817 on this basis. For this purpose, the processor unit may reduce the signal amplitude difference by one half or one third, for example, to obtain the control parameter. The control parameter is conveyed to adaptation unit 817, which increases or reduces the signal amplitude range of the window comparator on this basis, so that a detection window is increased or reduced. The signal amplitude range of the window comparator is thus determined exclusively on the basis of a range of the generator output signal and/or a variable depending on this range.

Figure 9:
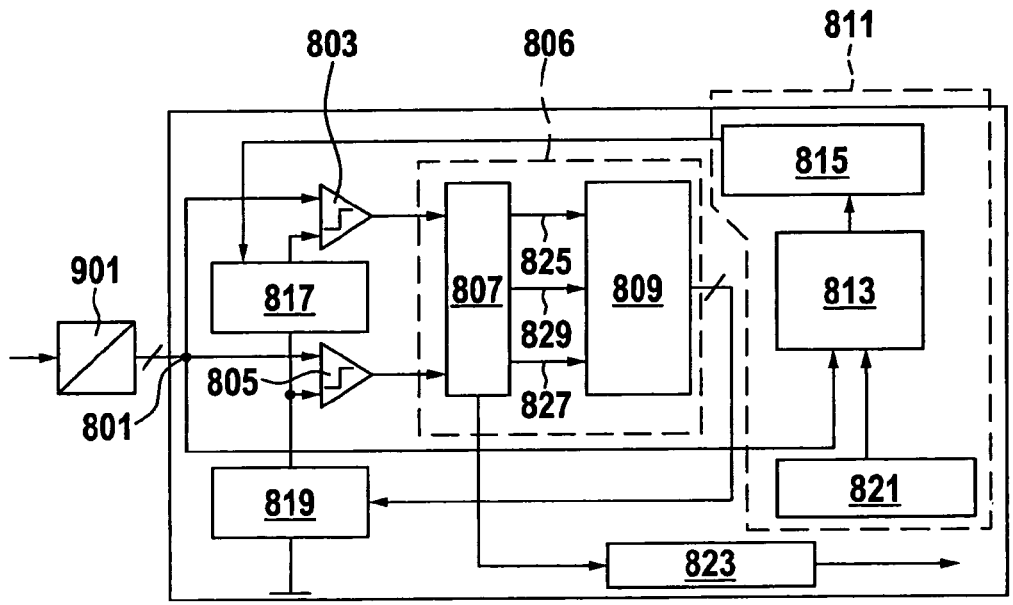
FIG. 9 shows a block diagram of a device for detecting a change in a generator output signal.

FIG. 9 shows as an example a completely digital structure of a device for detecting a change in a generator output signal, which includes an upstream analog-to-digital converter 901 in contrast with the structure shown in FIG. 8. According to one specific embodiment, determination unit 813 may still detect the signal amplitude difference on the basis of the output signal of counter 809, just as before. According to another specific embodiment, it is possible on the basis of upstream analog-to-digital converter 801 for determination unit 813 to be able to determine the signal amplitude difference, for example, a difference between a maximum amplitude and a minimum amplitude of the generator output signal, directly on the basis of a digital output signal, which represents the generator output signal and is output by the analog-to-digital converter.

In this case, determination unit 813 is able to determine the signal amplitude difference from a difference between a maximum digital value and a minimum digital value of the output signal of the analog-to-digital converter, for example. Control parameter $U_{AC}$ determined by processor unit 815 may be determined, for example, in the form of a voltage amplitude, which defines a window width of the window comparator. This voltage amplitude is no less than 0.6 V, for example, and no greater than 6 V. To determine the voltage amplitude, processor unit 815 may divide the ascertained peak-to-peak voltage, i.e., a difference between a minimum voltage and a maximum voltage, by a factor which may be equal to 2 or 3, for example. In general, control parameter $U_{AC}$ may be determined in the form of a voltage value, for example.

Alternatively, processor unit 815 may be designed to determine the control parameters in the form of the voltage value as a function of a peak-to-peak voltage of generator output signal $U_{Phase,ss}$ as follows, for example:

$U_{Phase\_SS}$=0 . . . <2 V . . . 2 V . . . <3 V 3 V . . . <6 V 6 V . . . <12 V $U_{AC}$=0.6 V 1.0 V 2.5 V 4.5 V According to the present invention, the window comparator threshold, for example, an a.c. (a.c.: alternating current) window comparator threshold is determined as a function of the measured signal amplitude of the generator output signal. The generator output signal may be, for example, one of the phase signals representing the respective phase of a total multiphase generator signal. Therefore, the window comparator threshold or the window comparator range of the signal amplitude fit adaptively to the signal amplitude and thus allow an optimal signal-to-noise ratio between a useful signal and an interference amplitude, which is optimal for each operating range and each generator. This achieves the result in an advantageous manner that no application-dependent adjustment of the phase analysis is necessary in the future.

Figure 1:
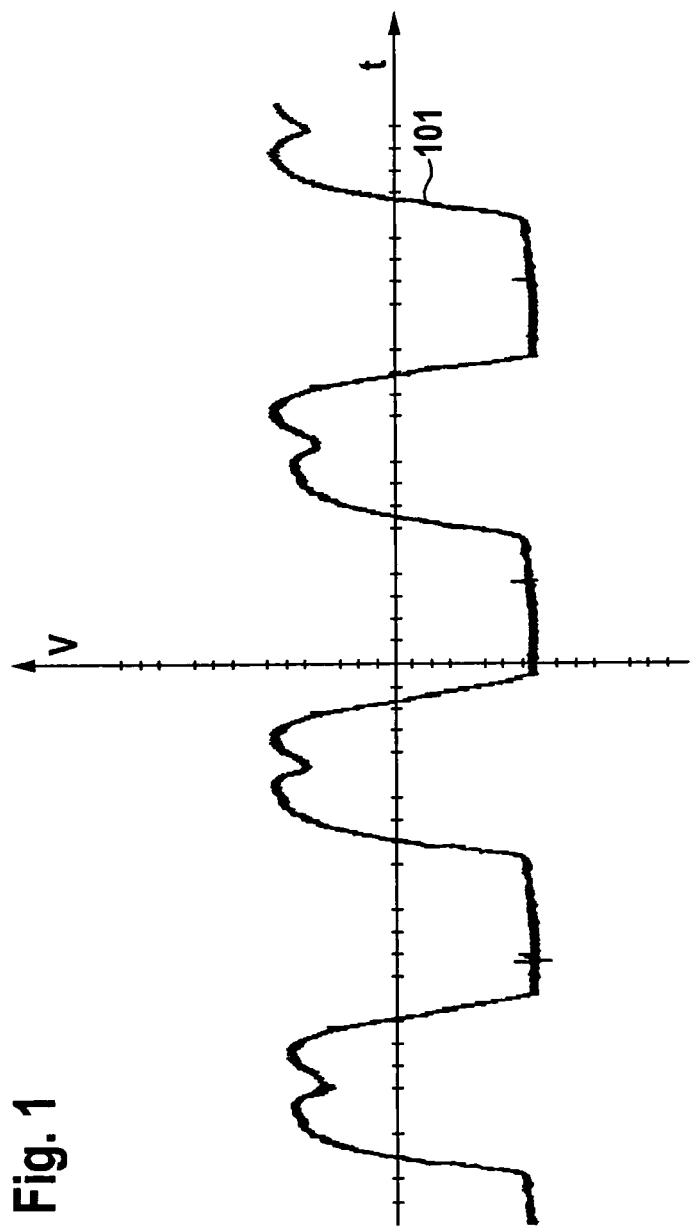
FIG. 1 shows a generator output signal.
Figure 2:
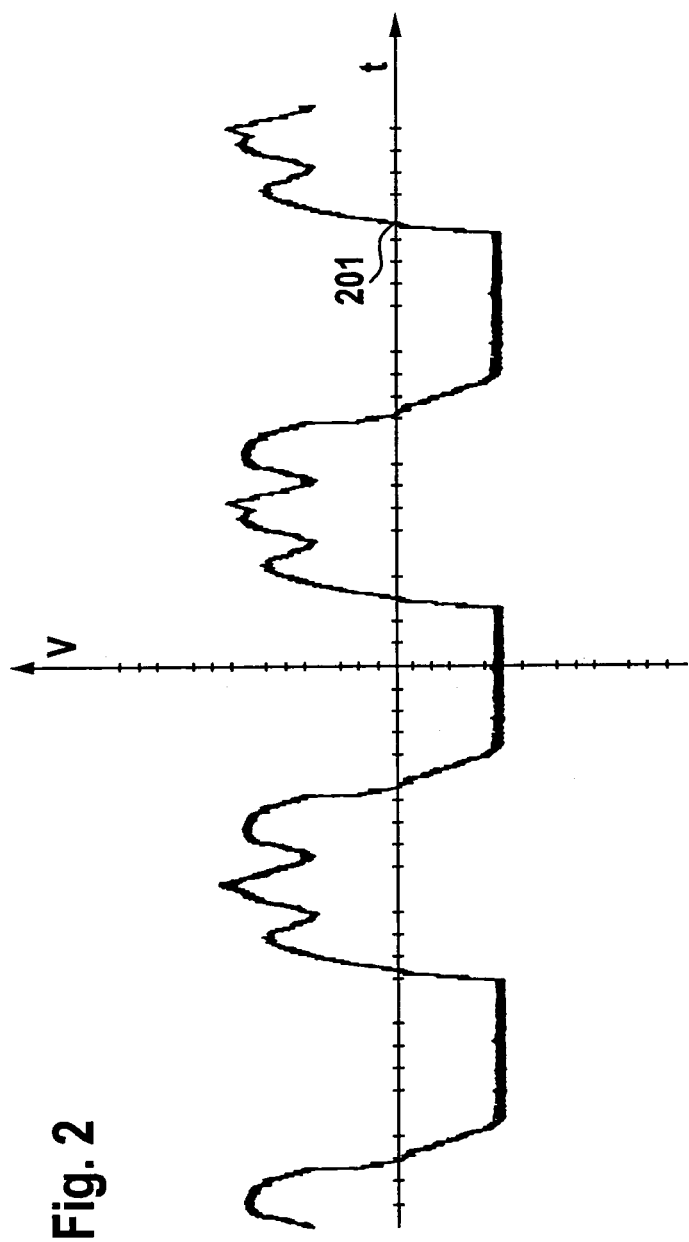
FIG. 2 shows a generator output signal.
Figure 3:
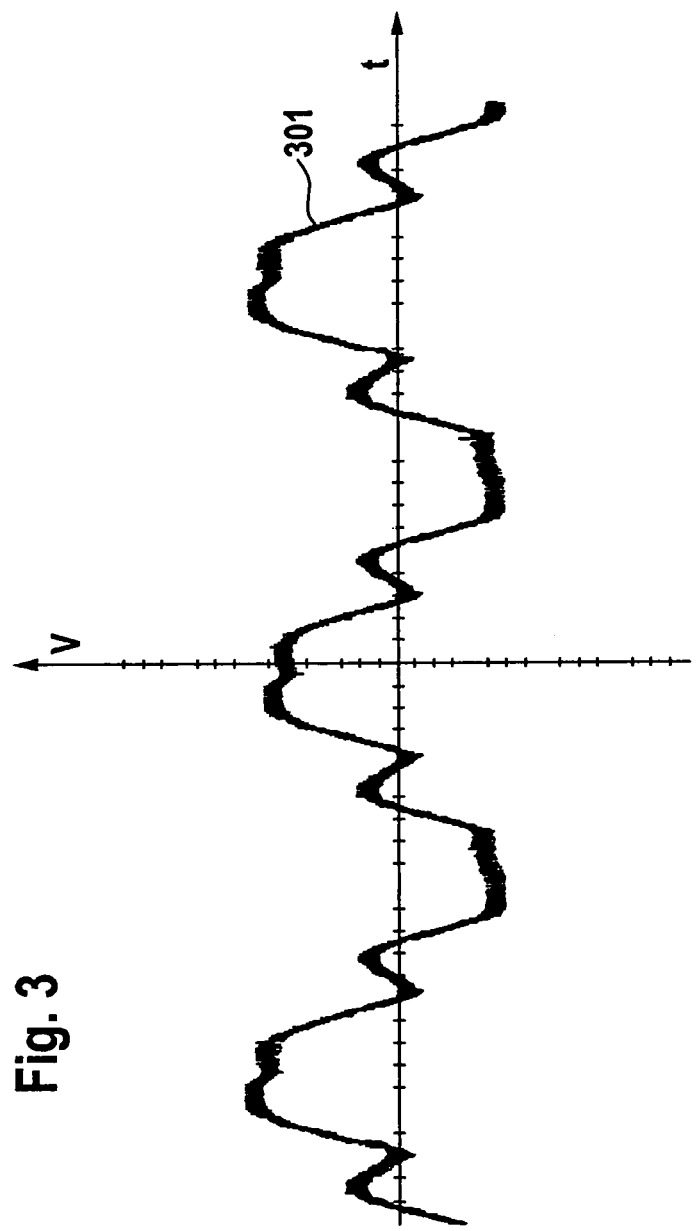
FIG. 3 shows a generator output signal.
Figure 4:
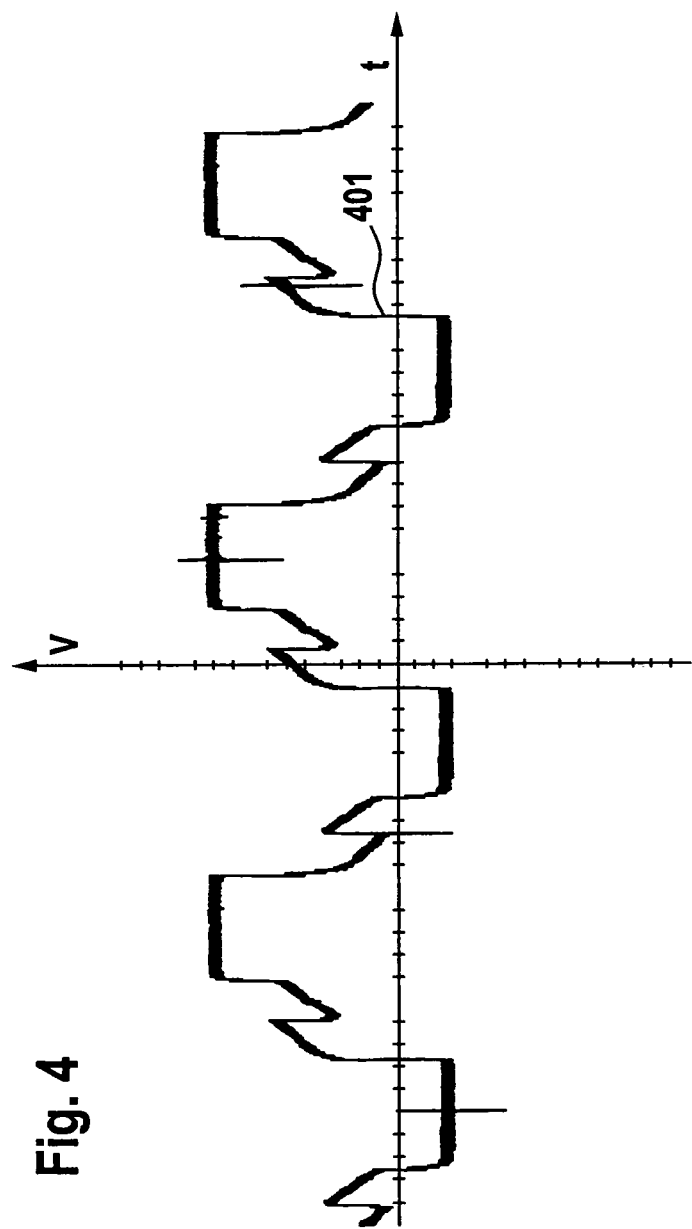
FIG. 4 shows a generator output signal.
Figure 5:
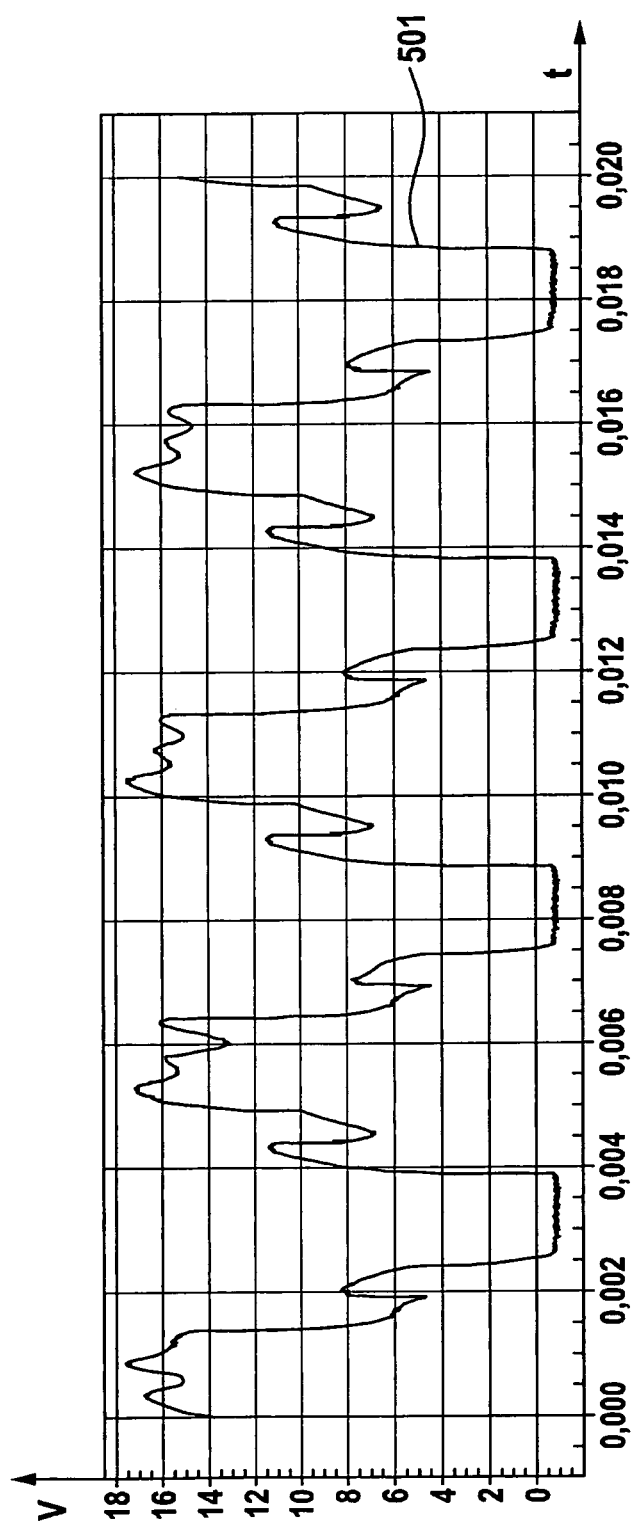
FIG. 5 shows a generator output signal.
Figure 6:
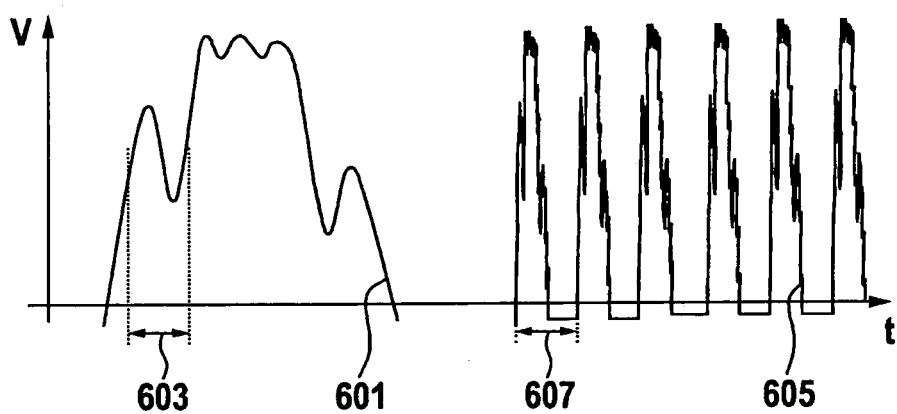
FIG. 6 shows a generator output signal.
Figure 7A:
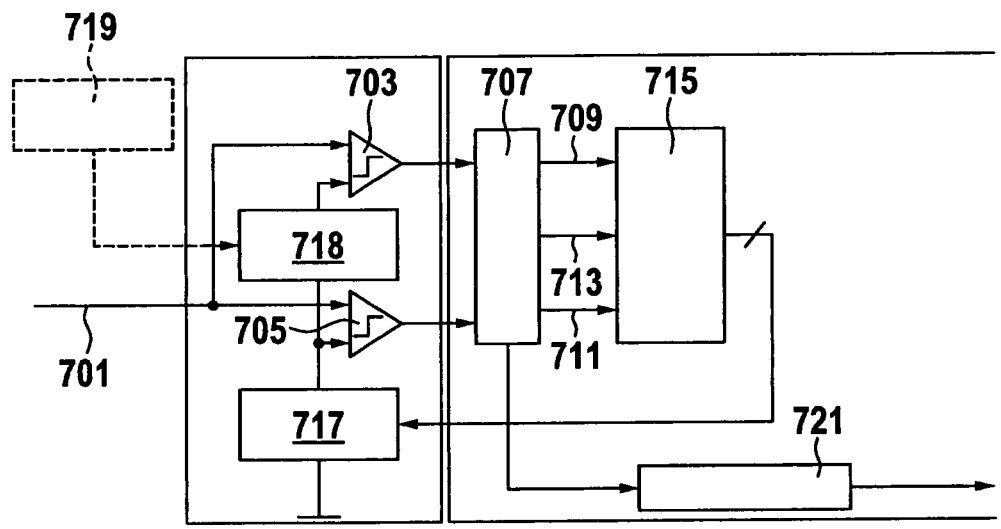
FIGS. 7a and 7b show block diagrams of a device for detecting a change in a generator output signal.
Figure 7B:
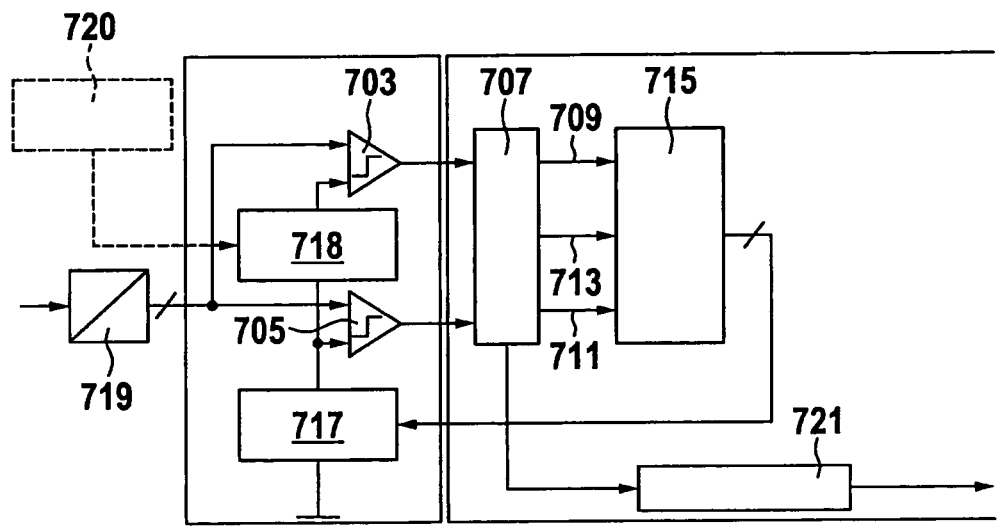

As illustrated in FIGS. 8 and 9, the frequency analysis is implemented by a downstream d.c. voltage offset (d.c. offset) and a connected window comparator threshold with the aid of the window comparator. The window comparator generates a control signal for incrementer/decrementer 809, which holds its count or increments or decrements the count. The window comparator threshold, which forms a hysteresis between an upper and a lower switching threshold, i.e., between the upper threshold value and the lower threshold value, however, is not implemented as a fixed threshold having predefined voltage values, as is the case in the exemplary embodiments illustrated in FIGS. 7a and 7b, for example. Depending on a regulator status for the starting operation or for an emergency start, a sensitive threshold may be selected, for example, by element 719. During normal operation, however, a much higher threshold having a larger signal-to-noise ratio is selected to mask out interference ripples. According to the present invention, however, the window comparator threshold is not predefined but instead depends on an amplitude of the generator output signal, i.e., on a phase amplitude, and is tracked adaptively. Therefore, an optimal signal-to-noise ratio is always made possible at each operating point.

Adaptation unit 817 adapts the window comparator threshold, i.e., the signal amplitude range defined by the window comparator, for example, via a variable adjustable voltage value, which may be supplied digitally or in the form of an analog value. The adaptation may be performed on the basis of a time interval, which is established by timer 821, so that a time window is predefined for detection of the generator output signal amplitude. This is detected by analysis of the numerical values of counter 809 or an output signal of converter 901. For example, minimum values and maximum values of the amplitude of the generator output signal, for example, the voltage amplitude, measured and detected in the predefined time interval, belong to the detection of the signal amplitude difference. For example, on the basis of a computation rule or characteristics map, processor unit 815 calculates or ascertains from the measured amplitude a control value in the form of the control parameter for the height of the window comparator threshold and conveys it to adaptation element 718.

FIGS. 10a, 10b and 10c show the process sequences over time again in greater detail. FIG. 10a shows the curve of a generator output signal voltage $U_V$, which represents the generator output signal. The signal amplitude difference may be represented, for example, in the form of a voltage value 1001, which may correspond to a value $U_{Phase\_SS}$, for example, and is designated by the arrows shown in FIG. 10a. FIG. 10b illustrates the definitive time intervals for tracking of the window comparator threshold. FIG. 10c illustrates the corresponding curve of the peak-to-peak voltage as a function of time.

What is claimed is:

1. A device for detecting a change in a generator output signal of a vehicle generator, comprising:
    a window comparator configured to compare a signal amplitude of the generator output signal with at least one threshold value which limits a signal amplitude range;
    a detector configured to detect a change in the generator output signal on the basis of an output signal of the window comparator;
    a detection unit configured to detect a signal amplitude difference between a maximum signal amplitude and a minimum signal amplitude of the generator output signal; and
    an adaptation unit configured to adapt the signal amplitude range of the window comparator on the basis of the signal amplitude difference when there is a change in the generator output signal.

2. The device as recited in claim 1, wherein the window comparator has a first comparator for comparing the signal amplitude with an upper threshold value of the signal amplitude range and a second comparator for comparing the signal amplitude with a lower threshold value of the signal amplitude range.

3. The device as recited in claim 1, wherein the detection unit is configured to detect the signal amplitude difference within a predetermined time interval.

4. The device as recited in claim 1, wherein:
the detection unit includes a processor unit for determining a control parameter as a function of the signal amplitude difference using one of a lookup table or a computation rule, the computation rule including reducing the signal amplitude difference by one of half, third, an integral factor, or a nonintegral factor; and
the adaptation unit is configured to adjust the signal amplitude range in response to the control parameter.

5. The device as recited in claim 3, wherein the detection unit is configured to determine the signal amplitude difference on the basis of one of the generator output signal or an output signal of the detector.

6. The device as recited in claim 1, wherein the detector includes: (i) a detection element for detecting a change in the signal amplitude difference; and (ii) a counter downstream from the detection element to increment or decrement a numerical value as a function of the change in the signal amplitude difference.

7. The device as recited in claim 6, wherein the detector is downstream from the window comparator.

8. The device according to claim 1, further comprising:
a DC voltage offset element for transmitting a DC voltage offset to the adaptation unit;
wherein the adaptation unit is configured to apply the DC voltage offset to the signal amplitude range according to the DC voltage offset.

9. The device as recited in claim 1, further comprising:
a frequency detection element for detecting a frequency of the generator output signal based on a change in the signal amplitude difference.

10. The device as recited in claim 1, further comprising:
an upstream filter unit configured to filter the generator output signal to obtain a filtered generator output signal, the upstream filter unit having a predetermined filter characteristic including a cutoff frequency;
a frequency-detection unit configured to detect a frequency of the filtered generator output signal; and
a cutoff-frequency adaptation unit configured to adapt the cutoff frequency of the filter unit as a function of the detected frequency of the filtered generator output signal.

11. A method for detecting a change in a generator output signal of a vehicle generator, comprising:
comparing a signal amplitude of the generator output signal with at least one threshold value which limits a signal amplitude range;
detecting a change in the generator output signal based on the comparison;
detecting a signal amplitude difference between a maximum signal amplitude and a minimum signal amplitude of the generator output signal; and
adapting the signal amplitude range on the basis of the signal amplitude difference when there is the change in the generator output signal.

* * * * *

UNITED STATES PATENT AND TRADEMARK OFFICE
CERTIFICATE OF CORRECTION

PATENT NO. : 8,692,522 B2  
APPLICATION NO. : 12/998506  
DATED : April 8, 2014  
INVENTOR(S) : Herz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this
Twenty-ninth Day of September, 2015

Michelle K. Lee
*Director of the United States Patent and Trademark Office*